Jan. 8, 1929.
H. C. MALLORY
1,698,164
METHOD OF PRODUCING EXPANSIBLE COLLAPSIBLE ELEMENTS
Original Filed April 22, 1914
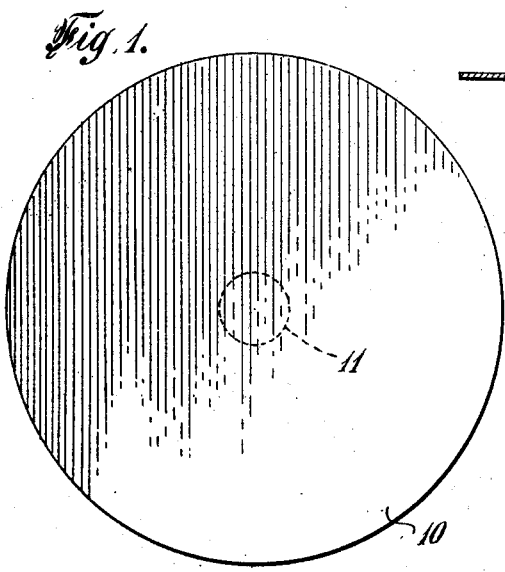
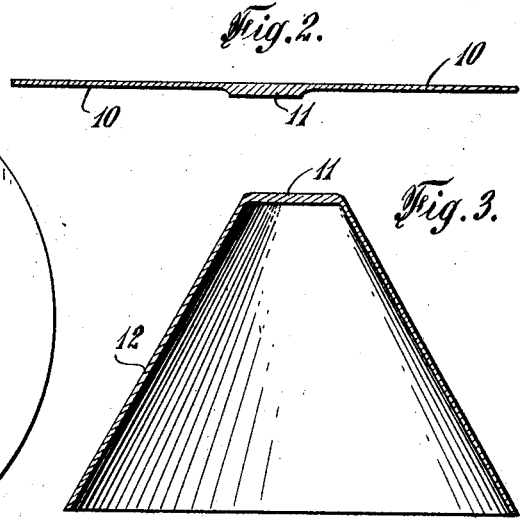
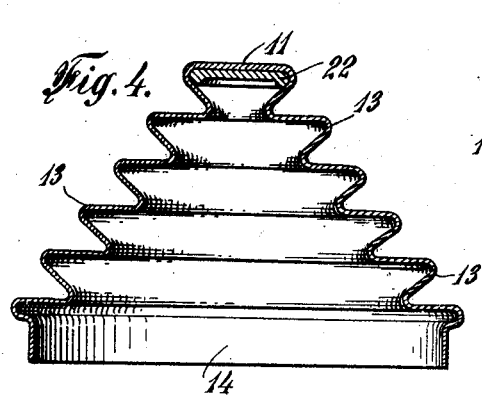
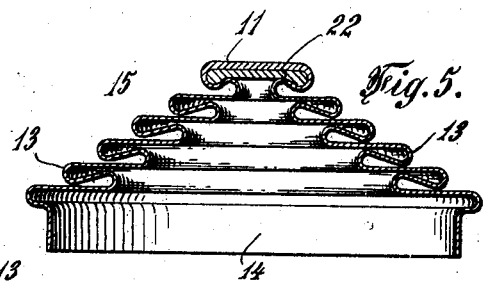
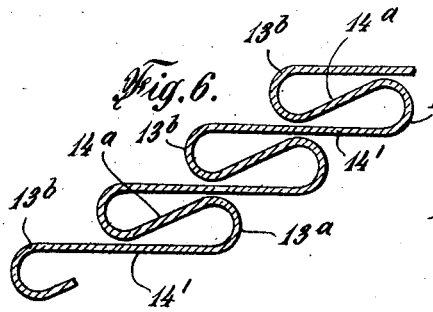
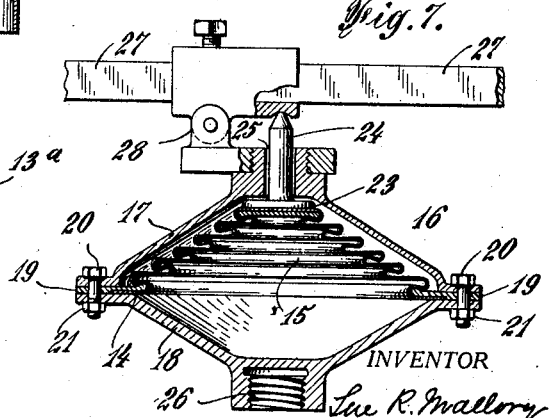
INVENTOR
Lee R. Mallory,
BY as Adm't Est. of Harry C. Mallory
Conrad A. Dietsch
her ATTORNEY Patented Jan. 8, 1929.

1,698,164

UNITED STATES PATENT OFFICE.

HARRY C. MALLORY, DECEASED, LATE OF BELLPORT, NEW YORK, BY SUE R. MALLORY, ADMINISTRATRIX, OF BELLPORT, NEW YORK; SAID HARRY C. MALLORY ASSIGNOR, BY MESNE ASSIGNMENTS, TO AMERICAN RADIATOR COMPANY, OF CHICAGO, ILLINOIS, A CORPORATION OF NEW JERSEY.

METHOD OF PRODUCING EXPANSIBLE COLLAPSIBLE ELEMENTS.

Original application filed April 22, 1914, Serial No. 833,593. Renewed December 5, 1919, Serial No. 342,802. Divided and application filed August 31, 1920, Serial No. 407,212. Divided and this application filed January 16, 1924. Serial No. 686,500.

The invention relates to improvements in methods for producing expansible-collapsible elements adapted for use in connection with thermosensitive of pressure sensitive devices, and for other purposes, and the same has for its object to provide an element of the diaphragm type which, while readily responsive to slight temperature or pressure variations, is not apt to fracture, or subject to other impairment as a result of use.

Further, said invention has for its object to provide an elastic or flexible element of the diaphragm type having a corrugated portion, the folds or bends of which are adapted to contact within the limit of the elasticity of the metal when the diaphragm or element is collapsed to its full extent.

Further, said invention has for its object to provide an expansible-collapsible element of the diaphragm type which is conical in form and capable of extended movement in response to pressure or temperature variations without liability of becoming fractured or impaired as a result of repeated expansion and contraction.

Further, said invention has for its object to provide an expansible-collapsible element of conical form having its body portion circumferentially corrugated, and the inner and outer rounded end portions or bends of said corrugations connected by alternately long and short lateral portions.

Further, said invention has for its object to provide a simple, convenient and practical method of producing an expansible-collapsible diaphragm of the character specified.

Other objects will in part be obvious, and in part be pointed out hereinafter.

To the attainment of the aforesaid objects and ends the invention consists in the several steps constituting the method hereinafter more fully described, and then pointed out in the claims.

In the accompanying drawings forming part of this specification wherein like numerals of reference indicate like parts;

Figure 1 is a face view showing a blank from which an expansible-collapsible element embodying the invention may be made;

Fig. 2 is a central sectional view thereof;

Fig. 3 is a central sectional view showing the first step of the process in which the flat blank is rolled, pressed or spun in conical form;

Fig. 4 is a similar view showing the blank as the same appears after it has been subjected to the action of suitable dies and circumferentially corrugated to a certain extent;

Fig. 5 is a similar view showing the blank with the corrugations fully developed therein, and provided at its open end with an annular flange or end;

Fig. 6 is an enlarged detail sectional view showing the construction and arrangement of the corrugations, and Fig. 7 is a detail central sectional view showing an expansible-collapsible diaphragm embodying the invention applied to a damper reglator for steam or hot water boilers, etc.

In producing an expansible-collapsible diaphragm there is first produced from a sheet of metal a flat, circular disk 10 having a thicker central portion 11 to form a reinforced closed end for the element. The said disk 10 is then rolled pressed or spun into conical form 12, as shown in Fig. 3, and successively subjected to the action of suitable dies whereby a series of circumferential corrugations 13 are produced therein, as shown at Fig. 4. By subjecting the blank 12 to the action of additional dies the bends or folds of the corrugations 13 are deepened as shown in Fig. 5, and a tubular flange 14 produced at the open end of the structure. By preference the flange 14 is made of greater thickness than the wall of the corrugated portion in order to form a substantial connecting portion whereby the diaphragm 15 may be conveniently secured to a suitable support.

In order to prevent the metal of the diaphragm 15 being strained beyond its elastic limit at approximately the center of the annular connecting portions when the diaphragm is collapsed to its full extent, the corrugations 13 are formed with rounded inner bends 13$^a$, and similar outer bends 13$^b$, and the ends of said outer bends 13$^b$, connected to, or united with one end of each of the inner bends 13$^a$ next above and below said outer bends 13$^b$ by a wide annular member 14', and a narrow member 14$^a$, respectively.

At Fig. 7 is shown an expansible-collapsible element of the diaphragm type as hereinabove described, incorporated in a damper regulator for boilers. In said construction the diaphragm 15 has its open, larger end secured to a casing 16 at the junction of the two sections 17, 18 by means of an annular member or flat ring 19 which embraces the lowermost corrugation adjoining the flange 14, and is secured in said casing by bolts 20 and nuts 21.

In the interior of the closed, smaller end of the diaphragm is secured a disk 22 which serves to reinforce said smaller closed end which is adapted to engage with the head 23 of the stem 24 which extends through an opening 25 in the upper end of the casing 16.

When the pressure in the boiler increases it will be communicated through the opening 26 in the base of the casing 16 to the interior of the diaphragm 15, and cause the same to expand and in so doing raise the stem 24, which in turn will act upon the under side of a lever 27, pivotally supported in bearings 28 provided upon the top of the casing 16. The free end of the lever 27 may be suitably connected to the damper in order to control the operation thereof.

The diaphragm 15 has its sides formed at such angle and the annular member 14′, 14ª of each corrugation formed of such length that the outer bends 13ᵇ, and the inner bends 13ª overlap, whereby when the diaphragm 15 is collapsed the upper sides of the under annular members 14′ will contact with the lower or under sides of the outer bends 13ᵇ and the under sides of the under members 14′ will contact with the inner, upper faces of the inner bends 13ª, and thereby form a stop and prevent the metal in the convolutions bending beyond the limit of its elasticity. This construction is particularly important in view of the fact that the corrugation having the greatest area, in this case shown at the bottom, is most flexible,—the flexibility decreasing in direct proportion as the area decreases. The corrugation having the greatest area will consequently collapse first when the diaphragm is subjected to pressure from above, and it is therefore necessary that each corrugation should be so formed as to make a stop within the limit of elasticity of the metal in order to prevent rupture of the diaphragm in said wider annular connecting members 14′, 14ª.

This application is a division of an application Serial No. 407,212, filed August 31, 1920, which in turn is a division of an earlier application, Serial No. 833,593, filed April 22, 1914, renewed December 5, 1919, Serial No. 342,802, and patented January 25, 1921, No. 1,366,473.

In this case no claim is made for the product, resulting from the method herein shown, described and claimed, as said product constitutes the subject matter of said application, Serial No. 407,212, which eventually resulted in Patent No. 1,484,141, dated February 19, 1924.

Having thus described said invention, what is claimed and desired to secure by Letters Patent is:

1. The method of making an expansible-collapsible element which consists in forming from a metal blank a conical body portion, and rendering said body portion elastic by forming circumferential corrugations therein, having their outer bends arranged in stepped formation, and each disposed in a horizontal plane midway between the next adjacent inner and outer bends, substantially as specified.

2. The method of making an expansible-collapsible element which consists in forming from a metal blank a conical body portion, and circumferentially corrugating said conical body portion to render the same elastic, said corrugations each having the center of its outer bend disposed in a vertical plane coinciding with the center of the inner bend next below the same, substantially as specified.

3. The method of making an expansible-collapsible element which consists in forming from a metal blank a conical body portion, circumferentially corrugating said portion to render the same elastic, and forming a tubular flange of greater thickness than said corrugated portion integrally therewith and extending therefrom, substantially as specified.

4. The method of making an expansible-collapsible element which consists in forming a shell, and forming circumferential elastic corrugations therein with the inner and outer bends thereof united by alternately narrow and wide annular connecting portions, substantially as specified.

5. The method of making an expansible-collapsible element which consists in forming from a metal blank a conical body portion, and forming circumferential elastic corrugations therein with rounded inner and outer bends united by alternately narrow and wide annular connecting portions, and arranging the outer bends of said corrugations in stepped formation, substantially as specified.

6. The method of making an expansible-collapsible element which consists in forming from a thin metal blank a conical body portion, forming a series of horizontal annular portions therein arranged in stepped formation and a series of inclined annular portions uniting said horizontal portions, and drawing said portions towards each other and forming circumferential corrugations in said body portion to render the same elastic, substantially as specified.

7. The method of making an expansible-collapsible element which consists in forming from a thin metal blank a conical body portion, forming a series of horizontal annular portions therein arranged in stepped formation and united by a series of narrower inclined annular portions, and drawing said horizontal annular portions towards each other by reversing the inclination of said narrower portions and forming a series of circumferential corrugations in said body portion to render the same elastic, substantially as specified.

8. The method of making an expansible-collapsible element which consists in forming from a thin metal blank a conical body portion, and forming in said body portion circumferential elastic corrugations with the outer bend of one corrugation disposed directly over the inner bend of the corrugation next below, substantially as specified.

9. The method of making an expansible-collapsible element which consists in forming from a thin metal blank a conical body portion, and forming in said conical body portion a series of circumferential elastic corrugations in stepped formation and with the alternate inner and outer bends thereof in superposed relation, substantially as specified.

10. The method of making an expansible-collapsible element which consists in forming from a thin metal blank a conical body portion, forming a series of horizontal annular portions therein arranged in stepped formation and united by a series of narrower inclined annular portions, and drawing said horizontal and inclined portions towards each other to deepen the corrugations formed thereby and to dispose the outer bend of one corrugation in overlying relation to the inner bend of the adjoining corrugation, substantially as specified.

Signed at the city of New York, in the county of New York, in the State of New York, this 15th day of January, one thousand nine hundred and twenty-four.

SUE R. MALLORY,
*Administratrix of Estate of Harry C. Mallory, Deceased.*